United States Patent
McDonald

(10) Patent No.: US 12,356,999 B2
(45) Date of Patent: Jul. 15, 2025

(54) BASKET FOR USE WITH A WASHING SYSTEM FOR THE CLEANING OF CRUSTACEA

(71) Applicant: Tim McDonald, Missouri City, TX (US)

(72) Inventor: Tim McDonald, Missouri City, TX (US)

(*) Notice: Subject to any disclaimer, the term of this patent is extended or adjusted under 35 U.S.C. 154(b) by 455 days.

(21) Appl. No.: 17/869,871

(22) Filed: Jul. 21, 2022

(65) Prior Publication Data

US 2022/0386633 A1 Dec. 8, 2022

Related U.S. Application Data

(63) Continuation-in-part of application No. 17/379,120, filed on Jul. 19, 2021, now Pat. No. 12,310,377, which is a continuation-in-part of application No. 15/988,651, filed on May 24, 2018, now Pat. No. 11,064,840, which is a continuation-in-part of application No. 14/877,519, filed on Oct. 7, 2015, now Pat. No. 10,456,812, which is a continuation-in-part of application No. 14/812,545, filed on Jul. 29, 2015, now Pat. No. 9,408,412, which is a continuation-in-part of application No. 14/550,195, filed on Nov. 21, 2014, now Pat. No. 9,320,286.

(51) Int. Cl.
A22C 25/00 (2006.01)
A22C 25/02 (2006.01)
A47J 43/24 (2006.01)

(52) U.S. Cl.
CPC ............... *A22C 25/02* (2013.01); *A47J 43/24* (2013.01)

(58) Field of Classification Search
CPC ....... B65D 25/16; B65D 25/18; B65D 21/233
USPC ...................... 220/23.83, 23.86, 23.87; 47/65
See application file for complete search history.

(56) References Cited

U.S. PATENT DOCUMENTS

| | | | |
|---|---|---|---|
| 2,660,754 A | 12/1953 | Roshko | |
| 2,781,544 A | 2/1957 | Skarmetta | |
| 3,137,096 A * | 6/1964 | Hopkins | A01G 27/00 47/79 |
| 3,958,022 A | 5/1976 | Danesh | |
| 4,356,665 A * | 11/1982 | de Oliveira | A01G 27/04 47/80 |
| 4,756,120 A * | 7/1988 | Arledge | A01G 31/06 47/59 R |
| 5,749,170 A * | 5/1998 | Furuta | A01G 27/003 47/79 |

(Continued)

Primary Examiner — Richard T Price, Jr.

(74) Attorney, Agent, or Firm — Egbert, McDaniel & Swartz, PLLC

(57) ABSTRACT

A basket for use in a crustacea washing system has a wall and the bottom that defines an interior volume. The wall has a plurality of openings formed therethrough. Each of the plurality of openings open to the interior volume. The wall of the basket has an indentation formed at an outer diameter thereof. The indentation is adapted to removably extend over a water-delivery pipe of the washing system. The wall of the basket is slightly tapered so as to have a wide outer diameter at the top of the basket and a narrow outer diameter of the bottom of the basket. The indentation has a plurality of holes that are adapted to correspond to apertures of the water delivery pipe.

12 Claims, 5 Drawing Sheets

(56) References Cited

U.S. PATENT DOCUMENTS

| | | | | |
|---|---|---|---|---|
| 5,992,092 A * | 11/1999 | Furuta | ............... | A01G 27/003 |
| | | | | 47/79 |
| 6,219,969 B1 * | 4/2001 | Dion | ................. | A01G 27/02 |
| | | | | 47/79 |
| 6,363,658 B1 * | 4/2002 | Lai | ................. | A01G 27/06 |
| | | | | 47/65.5 |
| D485,207 S * | 1/2004 | Dion | ................. | D11/143 |
| 7,087,257 B1 | 8/2006 | Prestenbach | | |
| 7,249,440 B2 * | 7/2007 | Caron | ................. | A01G 9/02 |
| | | | | 47/66.6 |
| 8,146,292 B2 * | 4/2012 | Brandstatter | ........ | A01G 27/02 |
| | | | | 47/79 |
| 9,320,286 B1 | 4/2016 | McDonald | | |
| 9,408,412 B2 | 8/2016 | Mcdonald | | |
| 2006/0230678 A1 * | 10/2006 | Ellis-Ei | ................. | A01G 27/02 |
| | | | | 47/79 |
| 2013/0093107 A1 | 4/2013 | Funderburg | | |
| 2013/0320008 A1 * | 12/2013 | Fu | ................. | A47L 15/26 |
| | | | | 220/23.83 |
| 2014/0127986 A1 | 5/2014 | Cady | | |
| 2021/0386080 A1 | 12/2021 | McDonald | | |
| 2023/0159258 A1 * | 5/2023 | Pawlick | ................. | A47J 27/16 |
| | | | | 426/113 |

* cited by examiner

BASKET FOR USE WITH A WASHING SYSTEM FOR THE CLEANING OF CRUSTACEA

CROSS-REFERENCE TO RELATED APPLICATIONS

The present application is a continuation-in-part of U.S. patent application Ser. No. 17/379,120, filed on Jul. 19, 2021 and entitled "Apparatus and Assembly for the Cleaning and Cooking of Seafood and Crustacea", presently pending. U.S. patent application Ser. No. 17/379,120 is a continuation-in-part of U.S. application Ser. No. 15/988,651, filed on May 24, 2018, now issued as U.S. Pat. No. 11,064,840. U.S. application Ser. No. 15/988,651 is a continuation-in-part of U.S. application Ser. No. 14/877,519, filed on Oct. 7, 2015, now issued as U.S. Pat. No. 10,456,812. U.S. application Ser. No. 14/877,519 is a continuation-in-part of U.S. application Ser. No. 14/812,545, filed on Jul. 29, 2015, now issued as U.S. Pat. No. 9,408,412. U.S. application Ser. No. 14/812,545 is a continuation-in-part of U.S. application Ser. No. 14/550,195, filed on Nov. 21, 2014, now U.S. Pat. No. 9,320,286.

BACKGROUND OF THE INVENTION

1. Field of the Invention

The present invention relates to the cleaning, washing and cooking of seafood and crustacea. More particularly, the present invention relates to the cleaning and cooking of crustacea. The present invention also relates to an apparatus that removes debris from the surface of the seafood or crustacea and conveniently allows the cleaned seafood or crustacea to be moved to a boiling pot. The present invention also relates to baskets as used in the cleaning and cooking of crustacea.

2. Description of Related Art Including Information Disclosed Under 37 CFR 1.97 and 37 CFR 1.98

Seafood boils refer to various types of social events in which shellfish or crustacea are the central elements. Regional variations dictate the kinds of seafoods, the accompaniments and side dishes, and in the preparation techniques (e.g. boiling, steaming, baking, or raw). In some cases, a boil may be sponsored by a community organization as a fundraiser or a mixture. Boils are also held by individuals for their friends and family for weekend get-togethers and summer holidays. There are also companies that can cater a boil for large and small events.

Shrimp, crab and crawfish boils are a Louisiana tradition and can be found across Louisiana and along the Gulf Coast. These shrimp, crab and crawfish boils are becoming more popular in various other areas around the United States and foreign countries. One reason for the popularity of crawfish is the price. Shrimp and crab or higher valued crustacea and may be a less affordable option for larger groups. A boil is usually carried out in a large pot (60 to 80 quarts) fitted with a strainer and heated by propane. Seasonings include crawfish boil packets, cayenne pepper, hot sauce, salt, lemons and bay leaves. Ears of corn, new potatoes, onions, and heads of garlic are usually added in shrimp and crawfish boils. Some people add smoked sausage links or mushrooms. When cooking crawfish, there is a debate over whether or not the crawfish must first be purged by covering them with clear water and a generous amount of salt for a few minutes. Advocates argue that this forces the crawfish to rid their bodies of impurities.

Prior to boiling the crustacea, it is important to clean the crustacea. Typically, the crawfish and shrimp can have debris and impurities on the outer surface thereof. If the crustacea are not cleaned, then this can present a gritty or unpleasant taste following the boil. Typical cleaning preparations, in the past, have been to place a large amount of crawfish into a bucket and then using a hose to spray water over the crawfish in the bucket. After the bucket is filled with water, the bucket is tipped over by hand manipulation so as to remove the debris-containing water. This requires a great deal of manual effort. Additionally, so as to assure that the crawfish and/or shrimp are very clean, this cleaning step must be carried out multiple times. Ultimately, after a suitable amount of cleaning, the crawfish or shrimp will be ready for the boil. During the steps of cleaning, it is quite common for some of the crawfish to escape the cleaning bucket. These crawfish must be manually retrieved and returned for further processing. Many people find that the process of cleaning the crawfish or shrimp is time-consuming and unpleasant. As such, a need has developed so as to be able to efficiently clean the crustacea prior to the step of boiling.

The cooking of many different foods, including vegetables, meats, seafood and crustacea is done by placing the food in a perforated basket, which is, in turn, placed into a larger pot. Typically, the pot contains a volume of liquid, such as water or cooking oil, in which the food within the basket is boiled or fried. Such arrangements have the advantage of permitting cooking of large volumes of individually small pieces of food and readily placing the large volume of food into the pot and removing the same, without the tedious process of scooping out small pieces of food cooked in a large pot. Due to the use of the basket, the entire volume of food may be placed into an removed from the pot at essentially the same time. Another desirable attribute of the basket/pot combination is that the cooking liquid, be it water or cooking oil, that is entrained on, in, at around the food is desirably drained back into the pot after cooking is complete, by suspending the basket over the pot above the liquid level of the pot.

In the past, various patents have issued relating to processes for cleaning crustacea, such as crawfish. In particular, U.S. Pat. No. 2,660,754, issued on Dec. 1, 1953 to F. O. Roshko, shows a crawfish picking machine for separating meat from the hulls of crawfish. The picking machine includes a frame having an upper and a lower roller mounting member, upper and lower parallel horizontally disposed rollers mounted one substantially vertically above the other on these members, adjustable tensioning means between the mounting members that yieldably urge the members and the associated rollers together to form a crotch between the rollers, and a drive means operatively connected with the rollers for positively rotating the rollers in opposite directions at a uniform rate. A water jet sprays in front of the crotch substantially parallel with the lower forward peripheral portion of the upper roller and has jet openings directed toward the peripheral portion of the upper roller between the spray and the crotch.

U.S. Pat. No. 2,781,544, issued on Feb. 19, 1957 to T. C. Skarmetta, shows a seafood cleaning machine. This shrimp cleaning machine includes a longitudinally extending generally flat shrimp-receiving platform having flexible, transversely downwardly curved side edges, a support means of which the flexible side edges are entrained, a means operatively connected the platform for transversely reciprocating the platform, longitudinally extending rollers engaging a top surface of the platform adjacent the side edges to form crotches with the platform. The rollers are oscillatably driven by their contact with the top surface of the platform. The surfaces of the rollers and the platform have different coefficients of friction whereby a shrimp received in a crotch will cling to one surface and slip on the other surface to thereby rotate the shrimp until a loose end of the shell is caught between the roller and the platform and the shell is unwound from the shrimp and drawn through the crotch and from the platform.

U.S. Pat. No. 3,958,022, issued on May 18, 1976 to A. Danesh, describes a process for treating seafood. This treatment of seafood allows toxic heavy metal ions to be removed from the seafood so as to make the seafood safe for consumption. The method includes washing the seafood with an organic sulfur complexing agent for heavy metal ions and heating the seafood at a temperature and for a time sufficient to volatilize the heavy metal ions therefrom.

U.S. Pat. No. 7,087,257, issued on Aug. 8, 2006 to Prestenbach, teaches a crustacea and seafood process for preparing fresh uncooked crustaceans, such as crawfish, lobster, crab and shrimp for shipment to consumers in a frozen state. The process includes a washing process. This washing process submerges the crustaceans in a few inches of clean running water. The crustaceans are treated with ozone introduction of a preservative and a bacteriacide while under a vacuum. The crustaceans are spray coated with a seasoning and then quick frozen. They are then packaged in bulk for individualized cook-and-serve containers.

U.S. Patent Application Publication No. 2013/0093107, published on Apr. 18, 2013 to R. Funderburg, discloses a fish and game washer that is designed to wash and clean meat. The meat is put into a bucket and a water source is connected thereto. Air is sucked in to mix with water. This causes the meat float up from the bottom and begin to toss and tumble. This takes the loose scales, feathers, blood and debris over the top of the bucket.

U.S. Patent Application Publication No. 2014/0127986, published on May 8, 2014 to W. Cady, describes a cleaning device that uses water pressure to prepare fish and wild game for consumption. A bucket is described having a conduit affixed to a wall thereof. The conduit can be connected to a source of water pressure such that water pressure is directed into the interior of the bucket so as to interact with the game within the interior of the bucket.

U.S. Pat. No. 9,320,286, issued on Apr. 26, 2016 to the present inventor, shows an apparatus and method for cleaning game. This apparatus has a container with an interior volume defined by a wall and a pipe positioned in the container adjacent to the wall. The pipe has at least one aperture suitable for directing a flow of water toward a portion of the wall spaced from the pipe such that the flow of water creates a cyclonic path in the container. The pipe extends generally vertically along the wall of the container. The pipe includes a plurality of apertures formed in spaced relation to each other along the length of the pipe.

U.S. Pat. No. 9,408,412, issued on Aug. 9, 2016 to the present inventor, describes an apparatus and method for cleaning produce. This apparatus has a container with an interior volume defined by a wall in a pipe positioned in the container adjacent the wall. The pipe has at least one aperture suitable for directing a flow of water toward a portion of the wall spaced from the pipe such that the flow of water creates a cyclonic path in the container. The pipe extends generally appropriate vertically along the wall of the container. The pipe includes a plurality of apertures formed in spaced relation to each other along the length of the pipe. The method includes overflowing the container such that the debris on the produce is removed from the produce.

U.S. Patent Application Publication No. 2021/0386080, published on Dec. 16, 2021 to the present inventor, discloses an assembly for cleaning and cooking seafood or crustacea. This assembly has a container with an interior volume defined by wall, a basket removably received in the interior volume of the container, a pipe positioned adjacent to the wall of the container and having a plurality of apertures adapted to direct the flow of water into an interior of the basket, a connector fluidically connected to the pipe, and a pot spaced from the container. The basket has a plurality of openings through a wall thereof. The connector has a portion extending outwardly of the wall of the container. The basket can be removably received in the pot.

After experiments with the subject matter of the above-identified patents and patent applications to the present inventor, it was found that the cleaning of the seafood or crustacea is accomplished in a very efficient manner. However, in particular with the cleaning of crawfish, the cleaned crawfish would have to be manually moved from the interior of the container and then into the basket and/or boiling pot. This collecting, lifting and movement of the crawfish could become a tedious process. This is particularly the case under those circumstances where at least some of the crawfish remain alive. As such, the present inventor determined that there was a need to allow the cleaned crawfish to be conveniently moved from the cleaning container and into the boiling pot.

U.S. Patent Application Publication No. 2021/0386080 was found to work extremely effectively and easily for the cleaning of crustacea. However, there were certain improvements that could be made in this prior application. In particular, it was found that the basket disclosed in this prior application had certain contours which could cause the accumulation of crawfish during the cleaning process. Furthermore, the indentation of the basket of this prior application included openings in different directions. These openings could obstruct the proper movement of crawfish during the cleaning process. It was found that these openings only needed to be in one direction in order to achieve an effective cleaning of the crawfish. This prior application describe the openings in the wall of the basket as being in a relatively random array. This random array somewhat impeded the uniform circulation of water through the interior of the basket. As such, the optimal washing of crawfish was not able to be achieved. As such, a need developed in which the configuration of the indentation and also the array of the openings are modified so as to improve the circulation characteristics of the water through the interior of the basket and to improve the drainage characteristics of the basket.

It is an object of the present invention provide an apparatus for cleaning seafood or crustacea that efficiently and effectively separates the debris from the body of the seafood or crustacea.

It is another object of the present invention provide an apparatus for cleaning seafood and crustacea which serves to pressure wash the seafood or crustacea.

It is another object of the present invention to provide an apparatus for cleaning seafood and crustacea that avoids the need to hand wash the seafood or crustacea.

It is still another object of the present invention to provide an apparatus for washing seafood or crustacea that facilitates the ability to clean the container after the washing process.

It is still another object of the present invention to provide an apparatus for the cleaning of seafood and crustacea which avoids the loss of such seafood or crustacea during the washing process.

It is another object of the present invention to provide an apparatus for the cleaning and cooking of seafood or crustacea which allows the crustacea to be easily moved from the cleaning container to the boiling pot.

It is still another object of the present invention to provide an apparatus for the cleaning and cooking of crustacea which allows the cleaning container, the basket and the boiling pot to be easily stacked in a nested relationship.

It is still a further object of the present invention to provide an apparatus for the cleaning and cooking of seafood or crustacea which can be easily stored, transported and displayed.

These and other objects and advantages of the present invention will become apparent from a reading of the attached specification and appended claims.

BRIEF SUMMARY OF THE INVENTION

The present invention is an article for use with a washing system for the washing of seafood and crustacea. The washing system has a container with a water-delivery pipe adjacent a wall of the container. The article comprises a basket having a wall and a bottom that defines an interior volume. The wall has a plurality of openings formed therethrough. Each of the plurality of openings open to the interior volume of the basket. The wall of the basket has an indentation formed at an outer diameter of the basket. The indentation is adapted to removably extend over the water-delivery pipe of the washing system.

The wall of the basket is slightly tapered so as to have a wide outer diameter at a top of the basket and a narrow outer diameter at the bottom of the basket. The bottom of the basket is generally planar.

The indentation has a plurality of holes formed therethrough. This plurality of holes is adapted to correspond to the apertures of the water-delivery pipe. These holes are formed only on one side of the indentation. The indentation extends from the bottom of the basket to an area adjacent to the top of the basket. The bottom of the basket has a plurality of openings formed therein. The plurality of openings at the bottom of the basket are adapted to allow water to drain from the basket.

The plurality of openings of the basket are arranged in a plurality of columns in which the openings of one column are spaced from the openings of an adjacent column. The plurality of openings of one column are different in number from a number of the plurality of openings of the adjacent column. The indentation is rounded on the wall facing the interior volume of the basket.

In the preferred embodiment of the present invention, the basket is formed of a metallic material. A handle is affixed to the top of the basket. This handle is movable between a retracted position and a deployed position. The retracted position lies at against the top of the basket. The deployed position extends outwardly of the top of the basket.

The present invention is also an assembly for the cleaning and cooking of seafood or crustacea. This assembly comprises a container having an interior volume defined by a wall, a basket removably received in the interior volume of the container and having a plurality of openings therethrough, a pipe positioned adjacent to the wall of the container, and a connector fluidically connected to the pipe. The pipe has a plurality of apertures adapted to direct the flow of water into an interior of the basket. The connector has a portion extending outwardly of the wall of the container.

The wall of the container is tapered such that the upper edge of the container has a diameter greater than a diameter of the bottom of the container. The basket has a tapered wall with a taper that generally matches the taper of the tapered wall of the container such that the basket nests in the interior volume of the container.

The wall of the basket has an indentation formed in an outer diameter of the basket. The indentation is adapted to removably extend over the pipe of the washing system. The indentation has a plurality of holes formed therethrough. This plurality of holes is adapted to correspond to the apertures of the pipe. These holes are formed on only one side of the indentation. The indentation extends from the bottom of the basket and ends adjacent to the top of the basket. The indentation is generally rounded on the wall facing the interior volume of the basket. The pipe is positioned adjacent to the wall of the basket. This pipe directs a flow of water through at least some of the plurality of openings of the basket so as to create a cyclonic path of water flow in an interior of the basket.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
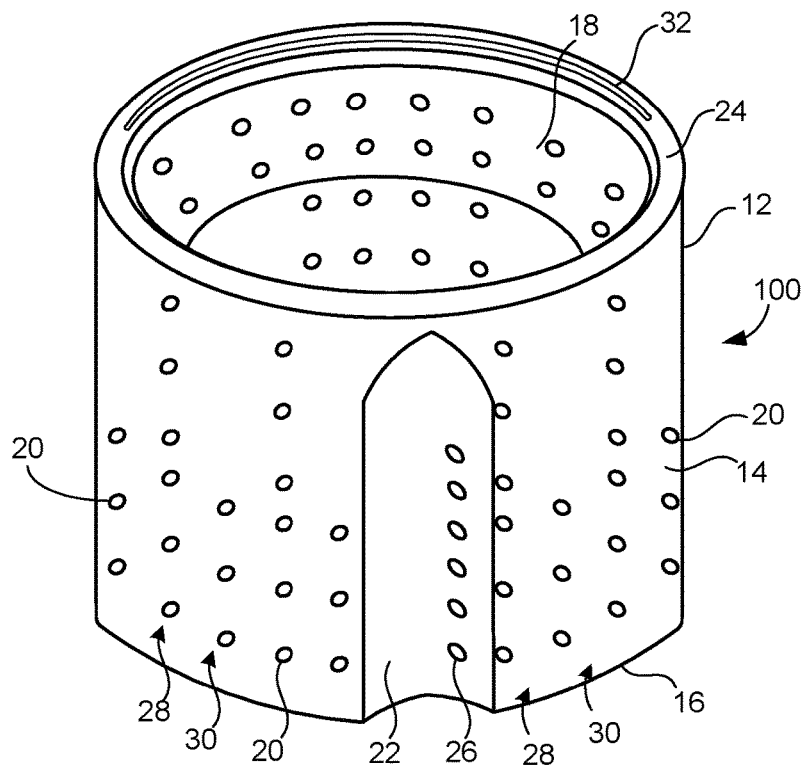
FIG. 1 is an upper perspective view of the basket of the washing system of the present invention.

Referring to FIG. 1, there is shown an article 10 for use with a washing system. The washing system that will have a container with a water-delivery pipe adjacent a wall of the container (to be described hereinafter). The article 10 comprises a basket 12 having a wall 14 and a bottom 16 that defines an interior volume 18. The wall 14 has a plurality of openings 20 formed therethrough. Each of the plurality of openings opens to the interior volume 18. The wall 14 of the basket 12 has an indentation 22 formed at an outer diameter of the basket 12. The indentation 22 is adapted to removably extend over the water-delivery pipe of the washing system.

In FIG. 1, it can be seen that the wall 14 the basket 12 is slightly tapered so as to have a wide outer diameter at a top 24 thereof and a narrow outer diameter at the bottom 16 thereof. The bottom 16 of the basket 12 is generally planar.

The indentation 22 has a plurality of holes 26 formed therethrough. The plurality of holes 26 open on only one side of the indentation 22. This plurality of holes 26 is adapted to correspond to apertures of the water-delivery pipe. The indentation 22 extends from the bottom 16 of the basket 12 and ends adjacent to the top 24 of the basket 12. The indentation 22 is generally rounded on the interior wall facing the interior volume 18 of the basket 12.

The plurality of openings 20 of the basket 12 are arranged in a plurality of columns 28 and 30 in which the openings in column 28 are spaced from the openings in column 30. The plurality of openings of column 28 are different in number from the number of openings in column 30. This arrangement extends around the outer diameter of the basket 12. It was found, after experimentation, that this array of openings enhances the flow characteristics of water within the interior of the container. This arrangement of openings also enhance the ability of the boiling water to interact with seafood on the interior of the basket 12 in order to effectively cook the seafood in the interior of the basket 12. This arrangement of openings in the columnar form also enhance the ability to drain water from the interior of the container 12 (especially with the basket is loaded with crawfish). As will be described hereinafter, when the basket 12 is lifted from the cleaning container and delivered over to the cooking pot, water will drain from the interior volume 18 of the basket 12 during the process of lifting. As such, this minimizes the amount of weight that must be transported between the cleaning container and the cooking pot. Once inside the cooking pot, water will flow back into the interior volume 18 of the container so as to effectively cook the seafood or crustacea residing in the interior of the basket 12.

The basket 12 is formed of a metallic material and, preferably, an aluminum material. A handle 32 is affixed to the top 24 of the basket 12. The handle 32 is movable between a retracted position (shown in FIG. 1) and a deployed position (shown in FIG. 3). The handle 32, in the retracted position, lies against the top of the basket 12. The handle 32, in the deployed position, extends outwardly of the top 24 of the basket 12.

Figure 2:
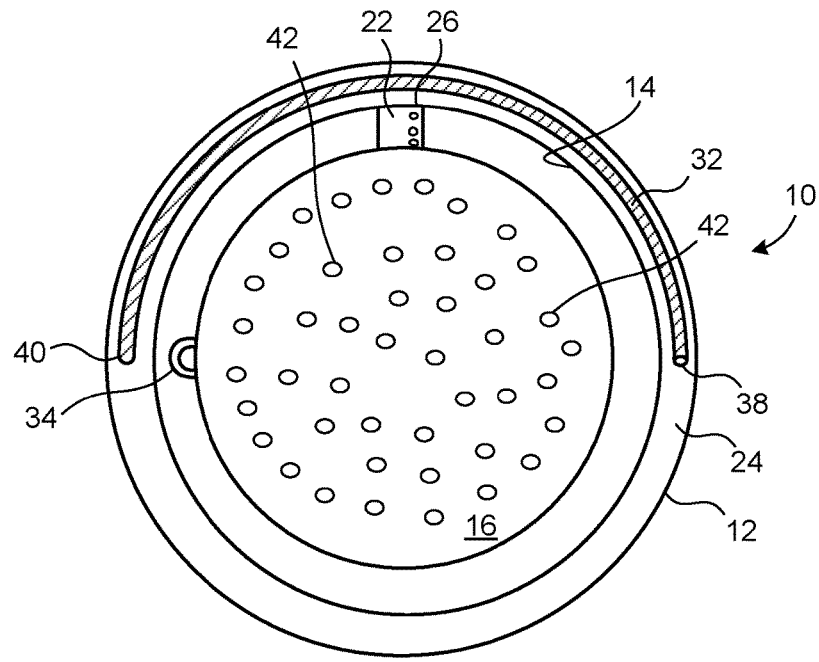
FIG. 2 is a plan view of the basket of the washing system of the present invention.

FIG. 2 is a plan view showing the article 10 of the present invention. Article 10 includes the basket 12 having indented area 22. It can be seen that the holes 26 are formed on only one side of the indented area 22. This is the side that corresponds to the apertures in the water-delivery pipe. There is another indented area 34 which is formed adjacent to the bottom 16 of the basket 12. Indented area 34 will correspond, in location, to the drain associated with the cleaning container. As such, when installed, the indented area 22 reside over the water delivery pipe while the indentation 34 will extend over the drain pipe. This two-points-of-contact arrangement of the basket 10 assures the proper orientation of the basket within the interior of the cleaning container. This assures that improper installation will not occur.

FIG. 2 shows that interior wall 18 is tapered so as to have a wide diameter at the top 24 of the basket 12 and a narrow diameter at the bottom 16 of the basket 12. The handle 32 is a semi-circular or elliptical handle that is hingedly mounted at points 38 and 40 at the top 24 of the basket 12. As such, in order to move the basket from the washing container to the cooking pot, it is only necessary to lift the handle 32, lift the basket, and then transport the basket 12, to the cooking pot.

FIG. 2 shows, in particular, that there are plurality of openings 42 extending through the bottom 16 of the basket 12. Openings 40 to further facilitate the ability for water to enter the interior of the basket 12 and facilitate the ability of water to drain from the interior volume 18 of the basket 12. The openings 42 are generally of a random pattern.

Importantly, it should be noted that the indentation 22 has rounded surfaces on the interior of wall 14. The rounded surfaces of indentation greatly smooth the circular flow of water therearound. There are no sharp edges that can create interference with the proper laminar flow of water during the cyclonic flow of water within the interior of the cleaning container. This greatly improves the cleaning process. Additionally, and furthermore, unlike the prior art, the indentation 22 has holes 26 only on one side of the indentation 22. These holes 26 will specifically correspond with the holes in the water-delivery pipe. The prior application by the present invention had holes on each side of the indentation. Since the second indentation 34 assures the proper alignment of the basket 12 with the water delivery pipe, there is no need for holes on each side of the indentation in order to accommodate different orientations of insertion of the basket 12 into the cleaning container. The two-points-of-contact approach of the present invention assures that proper installation will always occur. As such, the present invention avoids the interference with the proper cyclonic flow of water, and the movement of the crawfish that could be caused by the openings. If openings were on the opposite side of the indentation 22, there could be water accumulation within the indentation that could interfere with the proper delivery of water from the water delivery pipe and through the holes 26 on the other side of the indentation. As such, the present invention further assures the proper flow of water within the interior of the cleaning container.

Figure 3:
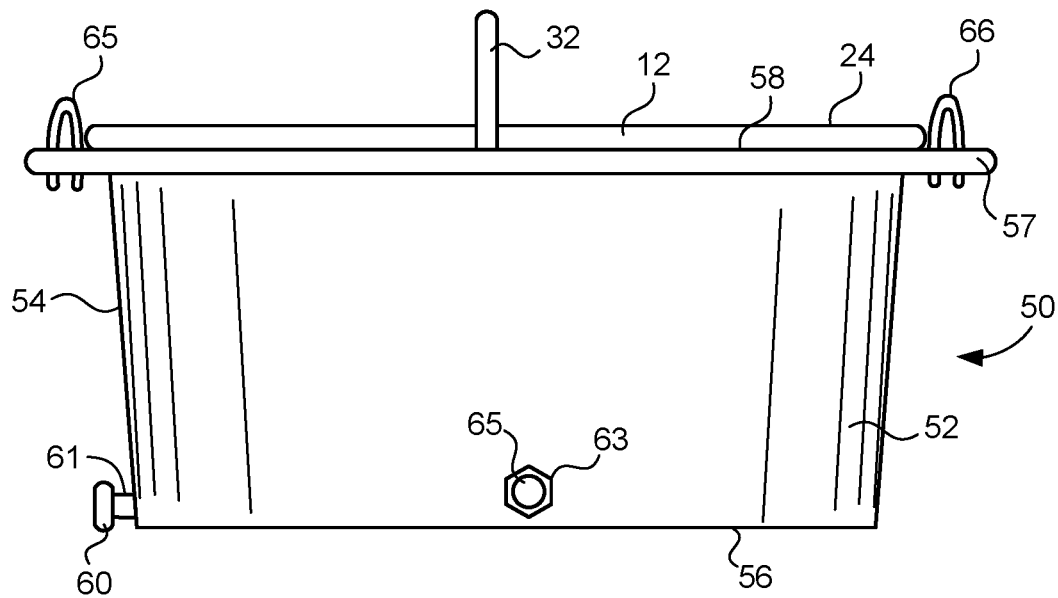
FIG. 3 is a side elevational view of the washing system of the present invention in which the basket is retained on the interior of the container.

FIG. 3 shows the assembly 50 is used for the cleaning of seafood or crustacea in accordance with the present invention. The assembly 50 includes a container 52 having an interior volume defined by a tapered wall 54. The container 52 has a bottom 56 and upper edge 58. A pipe, as will be described hereinafter, is positioned adjacent to the wall 54. The pipe will have a plurality of apertures adapted to direct the flow of water toward a portion of the wall spaced from the pipe such that the flow of water creates a cyclonic path in the container 52. A connector 60 is fluidically connected to the pipe adjacent to a lower end of the pipe. The connector 60 includes a portion 61 that extends outwardly of the wall 54 of the container 52. A drain 63 is affixed through the wall 54 of the container 52 so as to have a portion extending into the interior volume of the container 52. The drain 53 will communicate with the interior volume of the container 52. The drain 53 is positioned adjacent to the bottom 56 of the container 52. A closure 65 can be removably affixed over the open end of the drain 53 so as to block the flow of fluid from or into the interior volume of the container 52.

In FIG. 3, it can be seen that the container 52 has a diameter greater than a height of the container 52. For the washing of crawfish and/or seafood, this is particularly important so as to create the desired cyclonic path of water for the proper cleaning of the crawfish or seafood within the interior volume of the container 52. A lip 57 extends outwardly of the upper edge 58 of the container 52.

The basket 12 has its upper edge 24 bearing against the lip 57 of the container 52. As such, this relationship will support the basket 12 within the interior of the container 52. The handle 32 is connected to the basket 12 so as to allow for the proper lifting or lowering of the basket 12 into the container 52. The handle 32 can be hingedly or pivotally mounted to the top edge 24 of the basket 12 or it can be fixed thereto. The handle 32 extends upwardly above the upper edge 58 of the container 52. Within the concept of the present invention, various other configurations of handle can be applied to the basket 12 in order to allow for the proper lifting and lowering of the basket 12 from the container 52. The container 52 has rope-style handles 65 affixed to the lip 57 and extending upwardly therefrom. Handles 65 allow for easy transport and manipulation of the container 52. The handles 65 should be located beyond the outer diameter of the top edge 24 of the basket 12.

In FIG. 3, it can be seen that the wall 54 of the container 52 is tapered so as to widen from the bottom 56 toward the upper edge 58. This tapered configuration allows multiple containers 52 to nest within one another. This facilitates the ability to store, ship and display the assembly 50. The various appliances located on or within the container 52 can be stored at the bottom 56 of the container 52 during shipment. As such, this tapered configuration will allow for a very small amount of space to exist between the bottom of a higher container and the bottom of a lower container. The space can be used to accommodate the various appliances, such as the connector 60, the drain 63, the closure 65 and the pipe.

Figure 4:
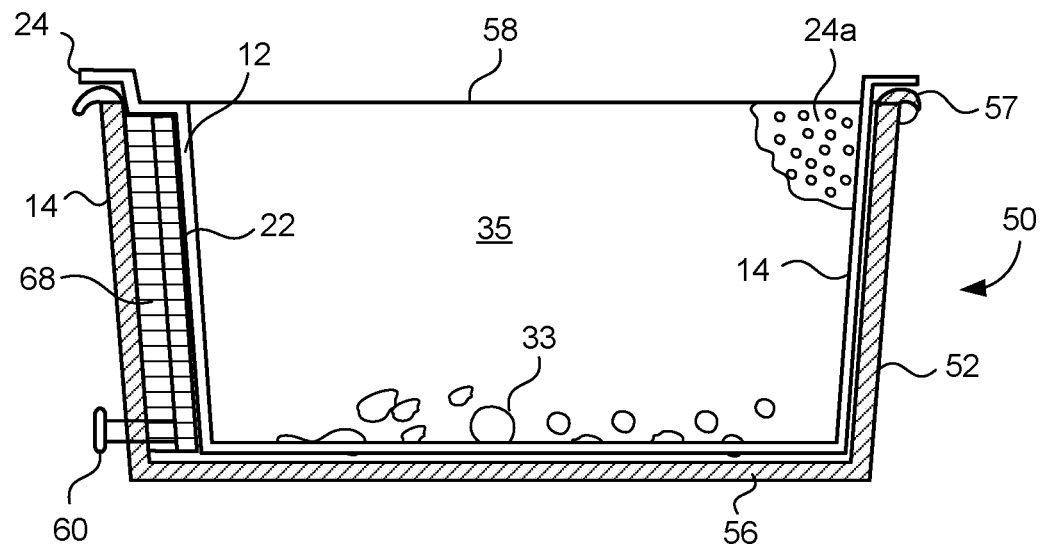
FIG. 4 is a cross-sectional view of the washing system of FIG. 3 showing, in particular, the placement of the basket over the water-delivery pipe of the washing system.

FIG. 4 is a cross-sectional view of the assembly 50 of the present invention. It can be seen that there is a pipe 68 that is positioned adjacent to the wall 54 of the container 52. The pipe 68 has a plurality of apertures adapted to direct a flow of water toward a portion of the wall 54 spaced from the pipe 68 such that the flow of water creates a cyclonic path in the container 52. The pipe 68 extends generally adjacent to the wall 54 of the container 52. The connector 60 is illustrated as extending through the wall 54 in fluid-tight relationship therewith so as to communicate with the bottom of the pipe 68. As such, when water is introduced through the connector 60 by the use of a water hose, the water flows upwardly through the pipe 68 and is sprayed through the various apertures of the pipe 68. The lower end of the pipe 68 will be generally adjacent to the bottom 56 of the container 52. The upper end of the pipe 68 will be spaced below the upper edge 58 of the container 52. FIG. 4 further shows that there are crustacea 33 received within the interior volume 35 of the basket 12.

In FIG. 4, the basket 12 is received within the interior of the container 52. The top edge or lip 24 of the basket 12 overlies the lip 57 at the upper edge 58 of the container 52. The wall 14 of the basket 12 has an angle of taper generally matching the angle of taper of the wall 54 of the container 52. As such, this will allow the basket 12 to nest within the container 52.

In FIG. 4, it can be seen that the indentation 22 is at or adjacent to the pipe 68. This indentation 22 allows the interior of the basket 12 to open to the water emitted through the apertures of the pipe 68. The indentation 22 can closely mate with the pipe 68 so that the indentation 22 has holes aligned with the apertures of the pipe 68 so as to allow the force of water emitted from the pipe 68 to be released into the interior 35 of the basket 12.

Figure 5:
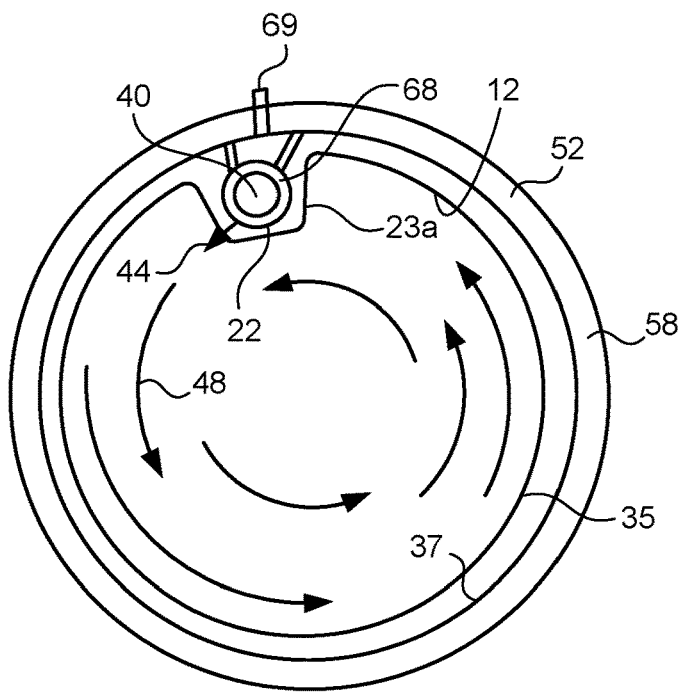
FIG. 5 is a plan view showing the manner in which the water-delivery pipe of the washing system passes water through the indentation of the basket and into the interior of the basket.

FIG. 5 illustrates a plan view of the container 52 showing the upper edge 58 of the container 52. The container 52 has inner wall 37 that defines the interior volume of the container 52. The pipe 68 is affixed by fasteners 69 to the inner wall of the container 52. The basket 12 is illustrated as received within the interior volume of the container 52. The basket 12 includes the indentation 22 which extends around the pipe 68.

In FIG. 5, shows that water is directed from the interior 40 of the pipe 68 outwardly through the apertures. As such, water will flow outwardly of the pipe 68 in a direction 44. This first direction of water flow will then pass through the holes 26 of the indentation 22. The water flow 44 is directed toward a portion of the inner wall of the container 52 in spaced relation to the pipe 68. By flowing the water in the first direction, a cyclonic path of water flow (illustrated by arrows 48) is created in the interior volume 35 of the basket 12. The cyclonic path of water flow 48 serves to effectively separate the debris from the seafood or crustacea. The apertures of the pipe 68 will distribute the jets of water over a substantial portion of the height of the basket 12 and/or the container 52. This has been found to enhance the strength of the cyclonic flow path and to create an improved washing effect. The smooth surfaces of the indentation facilitate the ability for this cyclonic path of water flow 48 to continue in its path without interruption. This avoids any clumping or accumulation of the seafood or crustacea against surfaces of the indentation. Since the holes in the indentation 22 are only located on one side of the indentation, there are no holes formed on the other side of the indentation which could further disrupt this cyclonic flow of water or, in any way, interfere with the release of water through the holes 26 from the apertures of the pipe 68.

FIG. 5 further shows that the flow of water passes through the apertures of the pipe 68 and through the holes 26 of the indentation 22. As such, this cyclonic flow of water will flow in the interior of the basket 12. This arrangement further effectively separates the debris from the seafood and/or crustacea.

Figure 6:
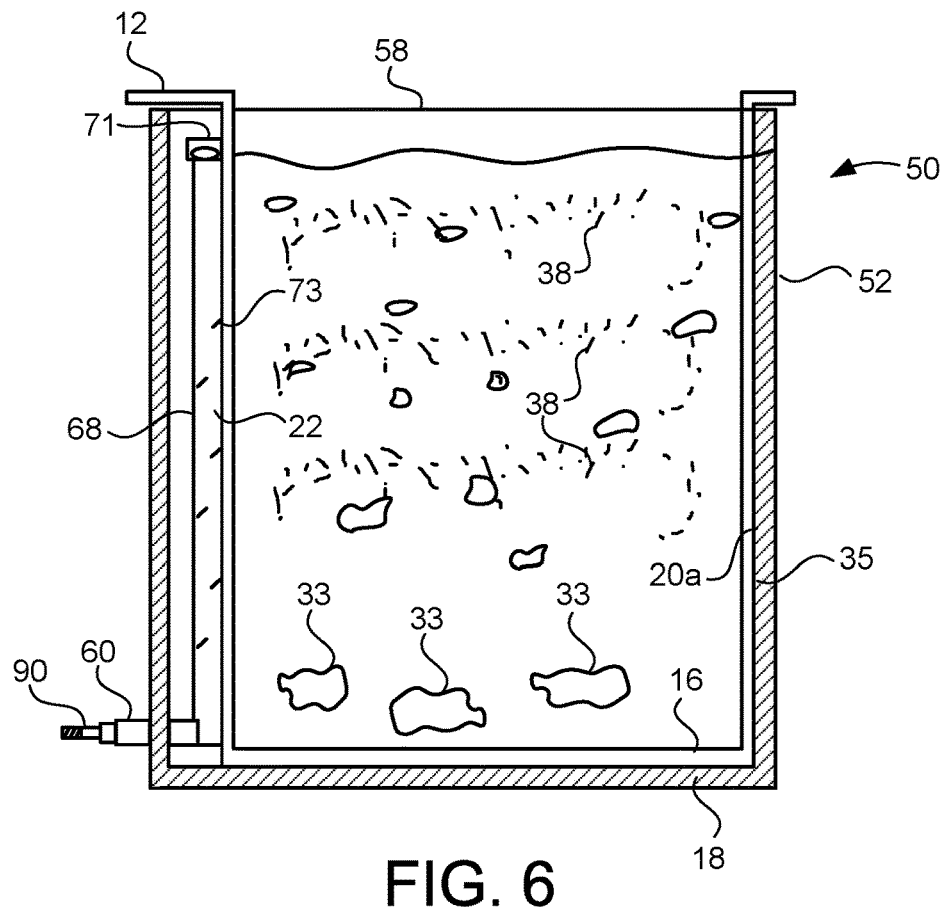
FIG. 6 is a cross-sectional view of the washing system of the present invention showing an early stage of the cleaning of the seafood or crustacea.

FIG. 6 shows a step in the process of cleaning the seafood or crustacea in accordance with the present invention. In FIG. 6, the assembly 50 includes the container 52 the basket 12 and the pipe 68. A garden hose 90 is connected to the connector 60. As such, the water hose 90 can deliver water under pressure through the connector 60 and into the interior of the pipe 68. The pipe 68 includes the closure 71 at an upper end thereof. Ultimately, the upper end of the pipe 68 should be disposed below the upper edge 58 of the container 52 or the basket 12. When the cyclonic water path is created in the manner described herein previously, the extension of the pipe 68 above the upper edge 58 would restrict the dispersion of the debris and release the debris. In other words, the cyclonic path of the flow of the debris would encounter the upper end of the pipe 68 and tend to clump and gather in such an area. Similarly, when the basket 12 is placed within the interior of the container 52, sharp edges associated with the indentation of the earlier application by the present invention could also cause an accumulation of debris in that area. As such, the smooth rounded edges of the indentation in the interior of the basket 12 avoids this accumulation of debris. In the present invention, the upper end of the pipe 68 should be disposed at a certain distance below the upper edge 58 of the container 52.

FIG. 6 shows that water has been introduced through the apertures of the pipe 68, through the holes 26 in the indentation 22 of the basket 12, into the interior 35 of the container 52, and into the interior of the basket 12. The introduction of the water in the cyclonic flow path illustrated in FIG. 5 causes the crustacea or seafood 33 to generally tumble in the area adjacent to the bottom 56 of the container 52 and the bottom 16 of the basket 12. The fan-type flow of water from the pipe 68 will serve to pressure-wash the tumbling crustacea or seafood 33. Additionally, the debris 38, in the nature of dirt, mud, blood, or the like, will tend to move upwardly toward the upper edge 58 of the container 52. This is because the debris 38 is generally less dense than water and less dense than the crustacea or seafood 33. The cyclonic flow of water within the container 52 also serves to urge the debris 38 upwardly. The continual flow of water into the interior of the container 52 will continually dilute the debris within the container. As such, the debris will mix with the water and be discharged in the manner shown in FIG. 7.

Figure 7:
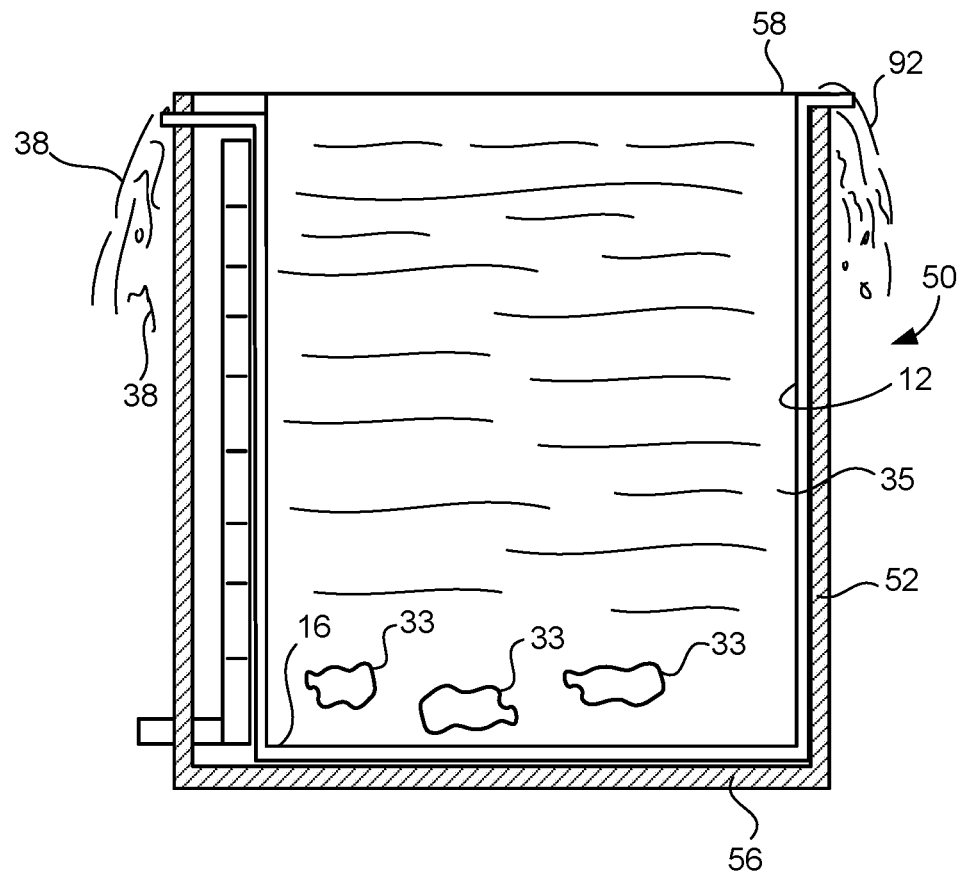
FIG. 7 is a cross-sectional view showing a later stage in the washing system of the cleaning of the seafood or crustacea.

In FIG. 7, it can be seen that a certain after a certain amount of time, the seafood or crustacea 33 will reside adjacent to the bottom 56 of the container and the bottom 16 of the basket 12. The water 92 from the interior 35 of the container 52 overflows the upper edge 58 of the container 52. This overflow will serve to discharge the debris 38 outwardly of the container 52. Ultimately, after a period of time, the debris from the crustacea or seafood will continue to dilute until only clear water resides within the interior 35 of the container 52. After the debris 38 has been discharged over the upper edge 58 of the container 52, and after the water has become sufficiently clear, the water flow can be turned off and the crustacea or seafood 33 removed from the interior 35 of the container 52. In other words, the basket 12 can be lifted from the container with all of the seafood in crustacea therein washed and cleaned. The crustacea or seafood will be very clean and suitable for use without further treatment. When crawfish is the crustacea used in the system of the present invention, the crawfish will be almost polished completely clean. As such, the basket 12 can be passed for boiling in the boiling pot during a crawfish boil. As such, the assembly 50 of the present invention avoids the requirement for meticulously manually washing the crustacea or seafood. There is no need to fill buckets with crawfish and then use a water hose direct to the bucket in order to spray the crawfish and further dump the bucket after several sprayings. The present invention allows the crustacea or seafood be cleaned in a relatively short period of time.

Figure 8:
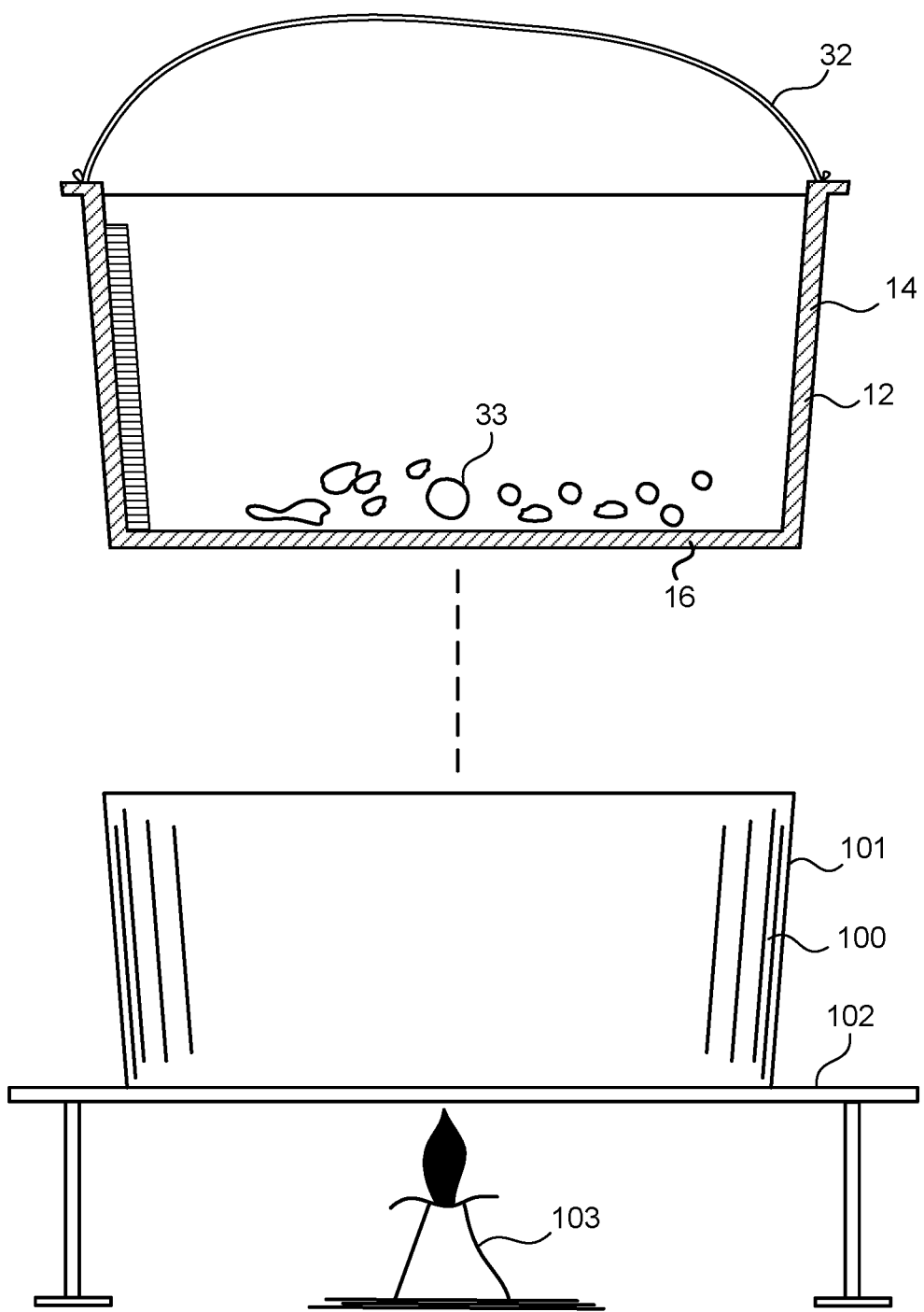
FIG. 8 is a partial cross-sectional view showing the introduction of the basket into an interior of a cooking pot.

FIG. 8 shows the how the basket 12 can be removed from the container 52 and repositioned within a cooking pot 100. Cooking pot 100 has a wall 101 that has a taper that matches the taper of the wall 14 of the basket 12. As such, the basket 12 will nest within the cooking pot 100 when lowered thereinto. The cooking pot 100 can include boiling water therein or other sort of cooking oil so as to facilitate the cooking of seafood or crustacea 33 within the basket 12. The openings in the basket 12 allows water or cooking oil to enter the basket 12 for the purpose of process of cooking the seafood or crustacea 33. As was stated herein previously, the unique array of openings on the basket 12 facilitates the ability for the water to drain from the interior of the basket 12 and also the ability for the boiling water or cooking oil to enter the interior of the basket (especially when the basket is filled with seafood or crustacea). This quick drainage of water from the basket 12 allows the basket to be of minimal weight when lifted. This facilitates the ability to easily transport the basket 12 from the container to the cooking pot 100.

The cooking pot 100 is supported above a platform 102. A source of heat 103 is located beneath the platform 102 so as to elevate the temperature of the cooking oil or water within the cooking pot 100. As such, the seafood or crustacea 33 can be cooked properly when the basket 12 is lowered into the cooking pot 100.

The present invention allows the basket 12 (which contains the seafood or crustacea 33) to be easily moved from the washing container 52 to the cooking pot 100. As such, the present invention avoids the need to collect the seafood from the bottom of the washing container 52 and physically move the seafood or crustacea into the basket of the cooking pot 100. As such, the cooking process is greatly improved in speed and efficiency. Also, since the angle of taper of the wall 16 of the basket 12 generally matches the angle of taper of the wall 101 of the cooking pot 100, a proper nesting relationship is achieved therebetween. A similar nesting arrangement occurs between the basket 12 and the washing container 52. Because of this angle of taper of the wall, each of the components of the cooking process can easily be nested within one another and stacked so as to provide for convenient shipping, storage and display.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An article for use in a washing system, the washing system having a container with a water-delivery pipe adjacent a wall of the container, the article comprising:
    a basket having a wall and a bottom that define an interior volume, the wall of said basket having an indentation formed in an outer diameter of said basket, the indentation adapted to removably extend over the water-delivery pipe of the washing system the wall having a plurality of openings formed therethrough away from the indentation, each of the plurality of openings opening to the interior volume.

2. The article of claim 1, the wall of said basket being slightly tapered so as to have a wide outer diameter at a top of said basket and a narrow outer diameter at the bottom of said basket.

3. The article of claim 1, the bottom of said basket being generally planar.

4. The article of claim 1, the bottom of said basket having a plurality of openings formed therein, the plurality of openings at the bottom of said basket adapted to allow water to drain from said basket.

5. The article of claim 1, the plurality of openings of said basket arranged in a plurality of columns in which the openings of one column are spaced from the openings of an adjacent column.

6. The article of claim 5, the openings of one column being different in number from a number of the openings of the adjacent column.

7. The article of claim 1, the indentation being rounded on a side of the wall facing the interior volume of said basket.

8. The article of claim 1, the basket being formed of a metallic material.

9. The article of claim 1, further comprising:
    a handle affixed to a top of said basket, the handle being movable between a retracted position and a deployed position, the retracted position lying the against the top of said basket, the deployed position extending outwardly of the top of said basket.

10. The article of claim 1, the washing system for the washing crustacea.

11. An article for use in a washing system, the washing system having a container with a water-delivery pipe adjacent a wall of the container, the article comprising:

a basket having a wall and a bottom that define an interior volume, the wall of said basket having an indentation formed in an outer diameter of said basket, the indentation adapted to removably extend over the water-delivery pipe of the washing system: the wall having a plurality of openings formed therethrough away from the indentation, each of the plurality of openings opening to the interior volume the indentation having a plurality of holes formed therethrough, the plurality of holes adapted to correspond to apertures of the water-delivery pipe, the plurality of holes of the indentation being adjacent the wall of the basket on only one side of the indentation.

12. An article for use in a washing system, the washing system having a container with a water-delivery pipe adjacent a wall of the container, the article comprising:

a basket having a wall and a bottom that define an interior volume, the wall of said basket having an indentation formed in an outer diameter of said basket, the indentation adapted to removably extend over the water-delivery pipe of the washing system: the wall having a plurality of openings formed therethrough away from the indentation, each of the plurality of openings opening to the interior volume, the indentation extending from the bottom of said basket and ending adjacent to a top of said basket.

\* \* \* \* \*